United States Patent [19]

Van Dusen

[11] Patent Number: 5,489,110
[45] Date of Patent: Feb. 6, 1996

[54] HITCH RACK FOOT LEVER CINCH

[75] Inventor: Donn S. Van Dusen, Loma Rica, Calif.

[73] Assignee: Mascotech Accessories, Inc., Port Huron, Mich.

[21] Appl. No.: 386,204

[22] Filed: Feb. 9, 1995

Related U.S. Application Data

[63] Continuation of Ser. No. 143,352, Oct. 26, 1993, abandoned.

[51] Int. Cl.⁶ .................................. B60R 9/06; B60R 9/10
[52] U.S. Cl. .................. 280/415.1; 280/769; 224/507; 224/521; 224/532; 224/537; 224/924; 224/917.5
[58] Field of Search ..................... 280/415.1, 504, 280/769; 224/42.06, 42.07, 42.08, 42.03 A, 42.03 B, 42.44; 414/462, 465, 466, 546, 743

[56] References Cited

U.S. PATENT DOCUMENTS

| | | | |
|---|---|---|---|
| 3,749,436 | 7/1973 | Hitchcock | 224/42.44 X |
| 4,381,069 | 4/1983 | Kreck | 280/415.1 X |
| 4,400,129 | 8/1983 | Eisenberg et al. | 224/42.44 X |
| 4,596,347 | 6/1986 | Hite | 224/42.08 |
| 4,957,228 | 9/1990 | Balka | 224/42.08 X |
| 5,011,361 | 4/1991 | Peterson | 224/42.08 X |
| 5,029,740 | 7/1991 | Cox | 280/415.1 X |
| 5,108,108 | 4/1992 | Spinka | 224/42.08 X |
| 5,181,822 | 1/1993 | Allsop et al. | 224/42.08 X |
| 5,190,195 | 3/1993 | Fullhart et al. | 224/42.44 X |

*Primary Examiner*—Margaret A. Focarino
*Assistant Examiner*—F. Zeender
*Attorney, Agent, or Firm*—Flehr, Hohbach, Test, Albritton & Herbert

[57] ABSTRACT

A hitch rack is described which cooperates with a hitch receiver on an automotive vehicle to enable a recreational or sporting article to be carried at the rear or front of a vehicle. The hitch rack includes a foot engagement bar for operating a cinch enabling the article support structure of the rack to be moved between a transportation and an inactive position.

8 Claims, 2 Drawing Sheets

HITCH RACK FOOT LEVER CINCH

This is a continuation of application Ser. No. 08/143,352 filed Oct. 26, 1993 now abandoned.

BACKGROUND OF THE INVENTION

The present invention relates to automotive vehicle racks of the type which are securable to a hitch of an automotive vehicle and, more particularly, to a rack having a foot operated cinch.

It is becoming common for recreational and participatory sport enthusiasts to want to carry recreation or sporting articles, such as bicycles or skis, at the rear (and sometimes front) of their vehicles. Hitch rack carriers have been designed to cooperate with the typical hitch receivers provided with commonly used tow hitches. For example, there are hitch bike carriers in which the rack suspends one or more bicycles at the rear of the vehicle with the bicycle support structure of the rack cantilevered upward from a tow hitch on the vehicle. (Hitch receivers are sometimes located at the front of a vehicle. For the purposes of this application, the adjective "tow" with respect to a hitch or hitch receiver is not meant to limit the invention to the particular location on a vehicle of such a hitch or receiver.)

It is often desirable to provide a rack arrangement which is movable to allow access to a gate or door of the vehicle without the rack having to be disconnected from the tow hitch. One difficulty which must be overcome with respect to such a moving arrangement is that in order to prevent damage and uncontrolled movement of the article support structure part of a rack, it is desirable for a user to have his/her hands free to guide the load through its movement. The problem is that it takes manipulation to actuate the cinch that also is part of the rack. Moreover, the cinch is often low—adjacent the tow hitch. It also is desirable that simple actuation of the cinch by, for example, a child will not result in unexpected movement.

SUMMARY OF THE INVENTION

The present invention facilitates release of a cinch on such a rack. In the rack of the invention, a lever is provided for operating its cinch, which lever is positioned and configured for actuation by a foot of a user to release the same while maintaining the user's hands free. Such rack preferably includes an elongated arm having the article support structure at an end. The arm is secured to a bracket for pivotal or other movement of the article support structure between a position for transportation of an article and an inactive release position. A cinch is provided for normally maintaining the arm locked in the transportation position. It is a lever for operating such cinch that is positioned and configured for actuation by a foot of a user. Most desirably, such lever includes a foot engagement bar which also acts as an obstruction to stop the article support structure via the arm from moving beyond a set release position.

A friction element is also preferably provided to hinder initial pivoting of the arm from the transportation position. This prevents one from being "surprised" by unintended quick movement of the article support structure immediately upon the cinch being released. Other features and advantages of the invention either will become apparent or will be described in connection with the following, more detailed description of a preferred embodiment of the invention.

BRIEF DESCRIPTION OF THE DRAWING

With reference to the accompanying drawing.

DETAILED DESCRIPTION OF THE PREFERRED EMBODIMENT

The following relatively detailed description is provided to satisfy the patent statutes. However, it will be appreciated by those skilled in the art that various changes and modifications can be made without departing from the invention.

Figure 1:
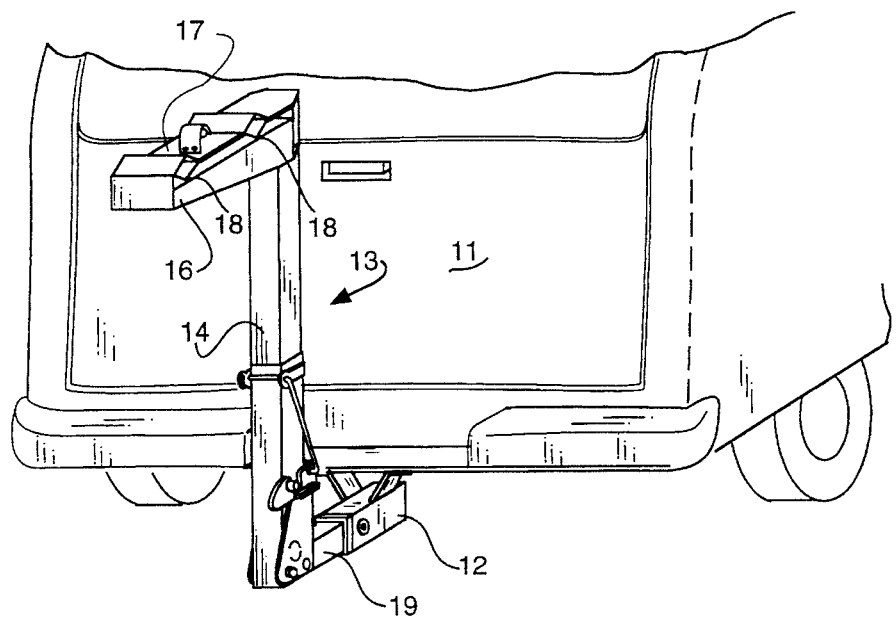
FIG. 1 is a broken-away isometric rear view of a vehicle illustrating a preferred embodiment of the rack of the invention secured to a tow hitch of the vehicle.

The rear end 11 of an automotive vehicle is illustrated in FIG. 1, with a standard tow hitch construction 12 depending therefrom. A hitch rack carrier of the invention, generally referred to by the reference numeral 13, is shown in place of the ball or other arrangement typically associated with a hitch of this type. Such rack includes an elongated arm 14 having at its upper end, an article support structure 16. Such article support structure in this embodiment is designed to carry bikes and, in this connection, includes a clamp 17 for securing the top rails of two bikes within V-shaped grooves 18.

Figure 2A:
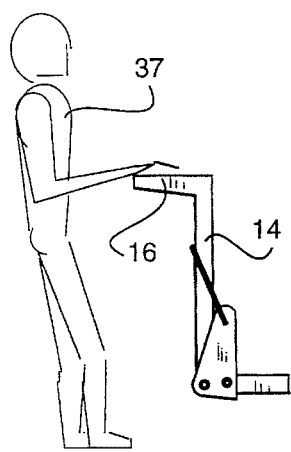
FIGS. 2A–2C are schematic side elevation views of the rack illustrating operation of the same by a user.
Figure 2B:
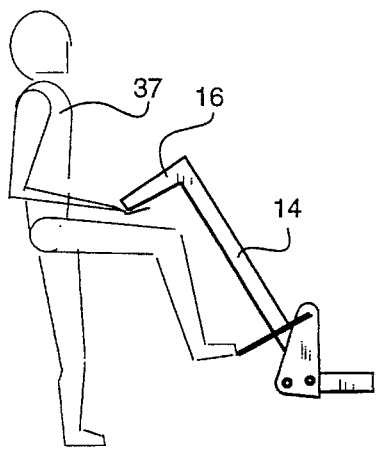
Figure 2C:
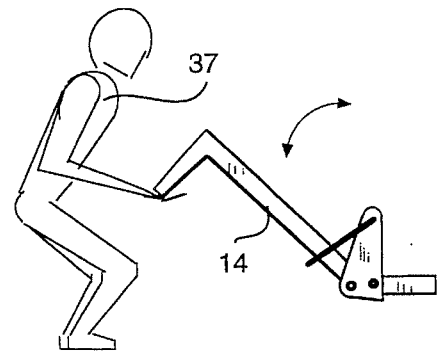

FIGS. 2A through 2C show movement of the rack between a transportation position and an inactive position in which access to a vehicle is provided. FIG. 2A shows the hitch carrier in the transportation position, whereas FIG. 2C shows the same moved fully to its inactive position.

Figure 3:
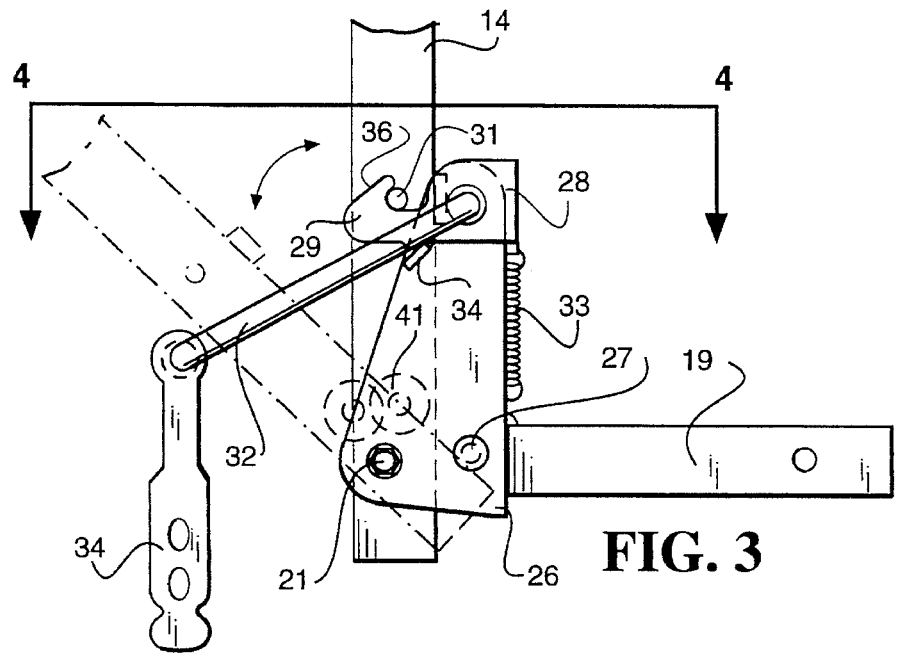
FIG. 3 is an enlarged broken-away side elevation view of the cinch arrangement of the preferred embodiment.
Figure 4A:
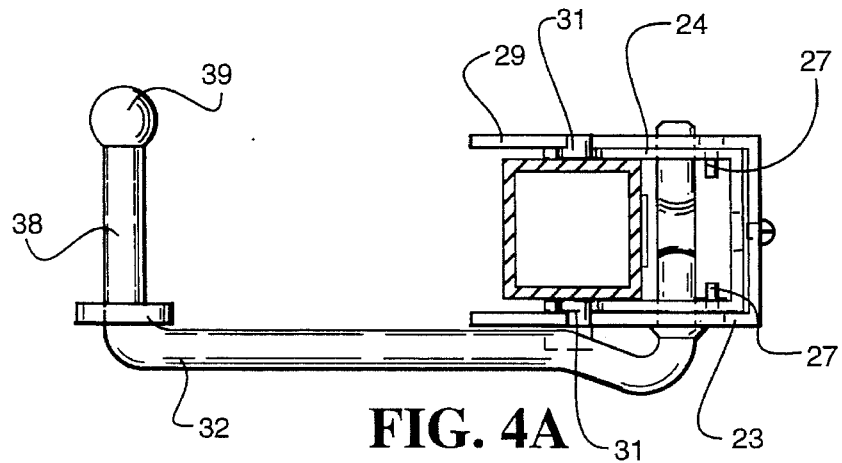
FIGS. 4A and 4B are sectional views illustrating the relationship of the lever of the invention to the remainder of the rack of the preferred embodiment.
Figure 4B:
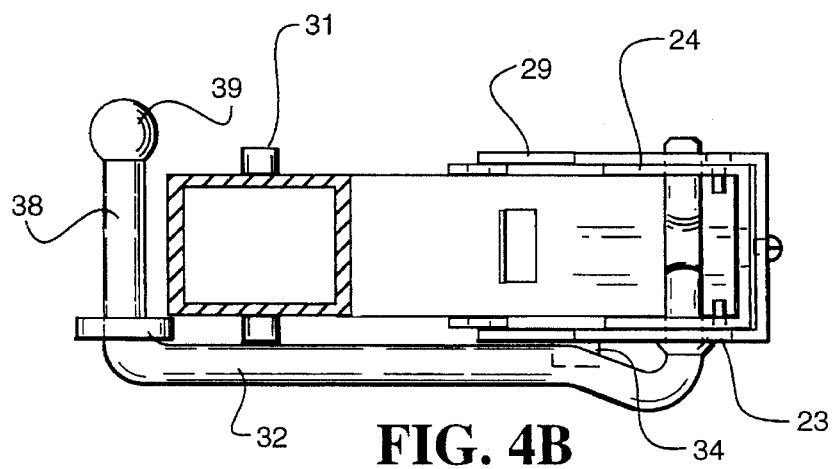

Reference is made to FIGS. 3 and 4A and 4B for a detailed description of the portion of the rack having the cinch. A drawbar 19 is provided as part of the rack to secure it to a vehicle. Such securance should be designed to assure that there is a rigid connection between the rack and the vehicle tow hitch. Arm 14 is part of a cantilever construction arrangement for the rack. It is pivotally mounted by a pair of opposed pins, only one of which, pin 21, is shown, between a pair of opposed walls 23 and 24 of a U-shaped bracket 26. The bracket defines a cavity between such walls which receives the arm. Such arm is pivotable between the transportation position and the inactive position defined by stop pins 27.

Bracket 26 includes a cinch to maintain the arm selectively in its transportation position. This cinch includes a spring loaded U-shaped hooking member 28 pivotally mounted on a portion of a lever latch (to be described in more detail hereinafter) 32 which extends between the walls 23 and 24. Hooking member 28 terminates in a pair of hooks 29 which engage associated pins 31 projecting from opposite sides of the arm 14. Such hooking member 28 is spring-loaded in tension by a coil spring 33 connected between a protuberance on the same and the body of the remainder of the bracket. It will be seen that such coil spring normally maintains the hooks 29 in engagement with the respective pins 31 as illustrated in FIGS. 3 and 4A. The lever latch 32, though, is movable downward to a position in which it engages a stop flange 34 on the hooking member to pivot the latter as necessary to release the pins 31 and, hence, the arm 14 for pivoting to the inactive position. Each of the hooks 29 includes a cam surface 36 which is engaged by the pin associated with the hook as the arm is pivoted toward its transportation position. This engagement moves the cinch downward against the spring pressure and permits it to engage the pin.

It will be seen from the above that the pin latch portion of the cinch normally maintains the arm in the transportation position but enables it to be simply released when it is desired to pivot the arm 14 and article support structure to the inactive position.

It is movement of the lever latch 32 to just beyond the position shown in FIG. 3 which results in release of the pin latch. The lever latch 32 is positioned and configured to facilitate operation of the same by a foot of a user. This is important in that, among other things, it frees the hands of a user to control movement of the article support structure. Such is illustrated in FIGS. 2A through 2C. With reference to such figures, as will be seen, a user represented schematically at 37 can control movement of the bike support structure 16 as the rack is converted from its transportation position shown in FIG. 2A to its inactive position shown in FIG. 2C.

It will be seen that the lever arm is positioned at a location at which it can be operated by a user's foot relatively easily. Moreover, to facilitate such operation it includes a foot/hand engagement bar 38 which extends generally parallel to the rear of a vehicle when the rack is connected thereto. Such foot engagement bar includes an end knob 39 which projects outward of all other structure of the carrier adjacent to it to permit access to the lever by a user's foot. It will be appreciated that when the lever is in its locking position illustrated in FIG. 2A, it is in close proximity to the arm 14. The portion of the engagement bar represented by knob 39 permits the foot of a user to have the access necessary to initiate the movement of the lever. It should be noted that in FIG. 2B the lever is in its full operating position. When the foot engagement bar is released, it returns against the spring loading to the position shown in FIG. 2C. In such position, the bar acts as an obstruction to prevent further pivoting of the arm 14 should pins 27 fail.

It should also be noted that in this preferred embodiment it is movement of the foot engagement bar and lever latch downward which results in release of the cinch. It will be recognized by those skilled in the art that the reverse arrangement is also possible, i.e., the locking position is one in which the foot engagement bar and lever latch is in a lower position. This may require the spring loading to be compressive spring loading rather than tensile.

As another feature of the instant invention, it includes a pair of friction elements which are positioned to inhibit initial free movement of the arm 14 upon release of the cinch. Such friction elements simply are a pair of cylindrical plastic shims 41 secured on opposite sides of the arm between such arm and the bracket side walls. These elements provide friction surfaces which engage the bracket as the arm pivots, and tend to inhibit such pivoting. The surface material and the engagement pressure are selected to counteract the weight of the article support structure. Thus, if the cinch should be unintendedly released, such as by a child, the article support structure will not simply fall. An exertion, although small, must still be applied to the arm to cause pivoting. It will be seen from FIG. 3 and 4B that as it pivots, a portion of the friction surface of each element 41 does not engage the bracket, thus making the movement freer.

As mentioned at the beginning of the detailed description, Applicant is not limited to the specific embodiment described above. Various changes and modifications can be made. The claims, their equivalents and their equivalent language define the scope of protection.

What is claimed is:

1. In a hitch rack carrier for an automotive vehicle having a hitch at an end of said vehicle, which hitch rack carrier includes an article support structure to be secured to said hitch for movement between a position for transportation of an article supported by said hitch rack carrier and a release position enabling access to said vehicle, a latch construction for said rack comprising the combination of:

(a) a cinch for locking said article support structure in said transportation position;

(b) a lever for operating said cinch, positioned and configured for actuation by a foot of a user to release said cinch while maintaining the hands of such user free; and (c) a friction element having a friction surface positioned both to inhibit while permitting initial movement of said article support structure from said transportation position upon release of said cinch and thereafter not to hinder free movement of said article support structure.

2. The hitch rack carrier of claim 1 wherein said lever includes a foot engagement bar which is generally transverse to the direction of intended travel of said vehicle when said hitch rack carrier is connected to the vehicle.

3. The hitch rack carrier of claim 1 wherein said lever includes a foot engagement bar which includes a portion which projects outward of all other structure of said carrier at the location of the bar to permit access to said bar by said user's foot.

4. The hitch rack carrier of claim 1 further including an elongated arm secured to a bracket for movement relative to the remainder of the bracket between said positions, said arm having said article support structure, said bracket being rigidly securable to said hitch, said cinch normally maintaining said arm in said transportation position, and said friction element being secured between said bracket and said arm to inhibit initial free movement of said arm upon release of said cinch.

5. In a hitch rack carrier for an automotive vehicle having a hitch at an end of said vehicle, which hitch rack carrier includes an article support structure having an arm to be secured to said hitch for movement of said article support structure between a position for transportation of an article supported by said hitch rack carrier and a set release position enabling access to said vehicle, a latch construction for said rack comprising the combination of:

(a) a cinch for locking said article support structure in said transportation position;

(b) a lever for operating said cinch, positioned and configured to be actuated by a foot of a user to release said cinch for movement of said article support structure to said set release position while maintaining the hands of such user free, said lever including a foot engagement bar which is exposed and generally transverse to the direction of travel of said vehicle when said hitch rack carrier is connected to the vehicle, said bar being configured and located to be in the path of movement of said arm when said article support structure moves to said set release position to also act as a stop which prevents said article support structure from moving beyond said set release position.

6. In a hitch rack carrier for an automotive vehicle having a hitch at an end of said vehicle, which hitch rack carrier includes an article support structure having an arm to be secured to said hitch for movement of said article support structure between a position for transportation of an article supported by said hitch rack carrier and a set release position enabling access to said vehicle, a latch construction for said rack comprising the combination of:

(a) a cinch for locking said article support structure in said transportation position;

(b) a lever for operating said cinch, positioned and configured for actuation by a foot of a user to release said cinch for movement of said article support structure to said set release position while maintaining the hands of such user free, said lever including a foot engagement bar which is exposed and generally transverse to the direction of travel of said vehicle when said hitch rack carrier is connected to the vehicle, said bar being configured and located to be in the path of movement of said arm when said article support structure moves to said set release position to also act as a stop which prevents said article support structure from moving beyond said set release position; and (c) further including an elongated arm secured to a bracket for movement between said positions, said arm having said article support structure, said bracket being rigidly securable to said hitch, and said cinch including a pin latch for maintaining said arm in said transportation position, said pin latch including a pin on one of said arm and bracket which is engageable by a hook on the other of said arm and bracket.

7. The hitch rack carrier of claim 6 wherein said article support structure includes support for one or more bicycles, one or more V-shaped grooves to receive the top rails of said one or more bicycles, and a clamp for securing said top rails within said grooves.

8. A hitch rack carrier for an automotive vehicle having a hitch receiver at what is the rear of said vehicle during forward travel thereof in the intended direction, which hitch rack carrier has a drawbar to be secured to said hitch receiver and an article support structure projecting at the rear of said vehicle when said drawbar is secured to said hitch for movement between a position for transportation of an article and an inactive position, comprising the combination of:

(a) an elongated arm having said article support structure;

(b) a bracket securable to said drawbar and to which said elongated arm is pivotably connected for movement between said two positions, which bracket includes a cinch for maintaining said arm in said transportation position; and (c) a friction element secured to position a friction surface between said bracket and said arm at a location at which said surface both inhibits while permitting initial pivotable movement of said arm from said transportation position and thereafter does not hinder free movement of said arm to said inactive position upon release of said cinch.

* * * * *